United States Patent
Fraas et al.

(10) Patent No.: US 7,324,527 B1
(45) Date of Patent: Jan. 29, 2008

(54) METHOD FOR CONNECTING COMMUNICATIONS TERMINALS TO A EXCHANGE VIA A COMMUNICATIONS NETWORK

(75) Inventors: Wolfgang Fraas, Wolfratshausen (DE); Klaus Hünlich, Neuching (DE); Klaus Wehrend, Eichenau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/806,265

(22) PCT Filed: Sep. 23, 1999

(86) PCT No.: PCT/DE99/03056

§ 371 (c)(1),
(2), (4) Date: Mar. 28, 2001

(87) PCT Pub. No.: WO00/19765

PCT Pub. Date: Apr. 6, 2000

(30) Foreign Application Priority Data

Sep. 30, 1998 (DE) ............................... 198 45 038

(51) Int. Cl.
*H04L 12/28* (2006.01)
*H04L 12/56* (2006.01)
*H04J 3/24* (2006.01)

(52) U.S. Cl. ...................... 370/401; 370/474

(58) Field of Classification Search ................ 370/352, 370/356, 395.1, 395.5, 395.6, 465, 466, 467, 370/395.51, 295.52, 400–401, 474
See application file for complete search history.

(56) References Cited

U.S. PATENT DOCUMENTS 5,420,858 A * 5/1995 Marshall et al. ............ 370/352

(Continued)

FOREIGN PATENT DOCUMENTS

EP 0 827 305 A1 3/1998

(Continued)

*Primary Examiner*—Kevin C. Harper
(74) *Attorney, Agent, or Firm*—Staas & Halsey LLP

(57) ABSTRACT

The communication terminals are connected to the packet-oriented communication network via a hub and the switching system is connected to the packet-oriented communication network via an access unit. A data format formed of substructural elements is set up for a data transmission between a switching system and the communication terminals. The data to be transmitted in the form of substructural elements are inserted into data packets at the transmitter end for a data transmission via the communication network. The substructural elements are extracted from the received data packets at the receiver end. Accordingly, the data packets have been transmitted transparently with no compression/decompression and conversion according to the RTP protocol at the transmitter and receiver end.

7 Claims, 3 Drawing Sheets

U.S. PATENT DOCUMENTS

| | | | |
|---|---|---|---|
| 5,548,589 A * | 8/1996 | Jeon et al. | 370/399 |
| 5,623,605 A * | 4/1997 | Keshav et al. | 709/236 |
| 5,710,756 A * | 1/1998 | Pasternak et al. | 370/216 |
| 5,930,265 A * | 7/1999 | Duault et al. | 370/473 |
| 5,946,309 A * | 8/1999 | Westberg et al. | 370/395.3 |
| 5,946,313 A * | 8/1999 | Allan et al. | 370/397 |
| 6,052,371 A * | 4/2000 | Lemieux | 370/338 |
| 6,172,977 B1 * | 1/2001 | Christie et al. | 370/395.61 |
| 6,229,821 B1 * | 5/2001 | Bharucha et al. | 370/471 |
| 6,282,196 B1 * | 8/2001 | Lyons et al. | 370/394 |
| 6,289,016 B1 * | 9/2001 | Subbiah et al. | 370/395.1 |
| 6,324,178 B1 * | 11/2001 | Lo et al. | 370/392 |
| 6,404,765 B1 * | 6/2002 | Bernstein et al. | 370/389 |
| 6,404,782 B1 * | 6/2002 | Berenbaum et al. | 370/522 |
| 6,483,842 B1 * | 11/2002 | Mauger | 370/420 |
| 6,567,425 B1 * | 5/2003 | Szabo et al. | 370/522 |
| 6,574,223 B1 * | 6/2003 | Brueckheimer et al. | 370/395.6 |
| 6,721,306 B1 * | 4/2004 | Farris et al. | 370/352 |
| 6,829,254 B1 * | 12/2004 | Rajahalme et al. | 370/535 |

FOREIGN PATENT DOCUMENTS

GB      2 322 516      8/1998

\* cited by examiner

METHOD FOR CONNECTING COMMUNICATIONS TERMINALS TO A EXCHANGE VIA A COMMUNICATIONS NETWORK

BACKGROUND OF THE INVENTION

1. Field of the Invention

The present invention is directed to a method for connecting communication terminals to a switching system.

2. Description of the Related Art

In modern communication technology, there exists an ever-increasing demand for broadband transmission of information such as, still and moving pictures in video telephone applications and of large volumes of data on the Internet. As a result, the significance of transmission technologies for high or variable data transmission rates (greater than 100 MBit/s) which take into account both the requirements of the data transmission (high speed at variable transmission bit rate) and the requirements of voice data transmission (maintenance of time correlations in the case of a data transmission by a communication network) is increasing. The asynchronous transfer mode (ATM) is a known data transmission method for high data speeds which additionally meets the requirements of voice data transmission.

This requires, in particular, broadband data transmission right up to the communication end point area, i.e. from the transmitting communication terminal to the receiving communication terminal that is frequently called end-to-end transmission in the literature. The consequence is that the number of ATM-capable communication terminals, i.e. of communication terminals which support the ATM data format for a transmission of data between communication terminals and the switching system associated with the communication terminal, rises drastically.

If such ATM-capable communication terminals are connected to a switching system not directly but via a non-ATM-oriented communication network, (for example due to a large distance between the communication terminal and the switching system associated with the communication terminal) the ATM data format must be converted to the data format of the communication network before any transmission of data via the communication network takes place. If this communication network is a data network which frequently already exists in companies and in which, preferably, Internet protocols (IPs) are used such as, for example, the "Ethernet" or the "Tokenring", the transmission of data to be transmitted in a voice call will take place via such an IP-oriented communication network in accordance with the Realtime Transport Protocol (RTP) according to ITU-T (International Telecommunication Union) Standard H.225.0.

If compressed voice data are transmitted—as used, for example, in mobile radio—these compressed voice data must be decompressed at the transmitter end before they are transmitted via the IP-oriented communication network, converted into the IP data format according to the RTP protocol and then recompressed for the transmission. Furthermore, the data must be decompressed at the receiver end, converted into the original data format and then recompressed for the further transmission. This frequent compression/decompression of the voice data leads to a corruption at the receiver end of the voice data originally transmitted which may be audible and can thus be sensed to be disturbing.

It is the object of the following invention to specify a method by means of which voice data transmission via an IP-oriented computer network is made possible without loss of voice quality.

To provide a better understanding of a data transmission between an ATM-capable communication terminal and a switching system associated with the communication terminal, it appears to be necessary first of all to discuss known principles again in greater detail.

A data transmission between an ATM-capable communication terminal and a switching system associated with the communication terminal—frequently called Home PBX of the communication terminal in the literature—usually takes place on the basis of so-called CPS (Common Part Sublayer) packets—referred to as substructural elements SE in the following text—according to the so-called ATM adaptation layer AAL-Typ2. In this arrangement, the ATM adaptation layer AAL provides an adaptation between the format of the ATM layer (layer 2) and the network layer (layer 3) of the OSI (Open System Interconnection) reference model.

A substructural element SE is composed of a 3-byte-long cell header SH and a payload area I of variable length (0 to 64 bytes). The cell header of a substructural element SE, in turn, is subdivided into an 8-bit-long channel identifier CID, a 6-bit-long length indicator LI, a 5-bit-long user-to-user indication UUI and a 5-bit-long cell header error control HEC.

SUMMARY OF THE INVENTION

A significant advantage of the method according to the present invention consists in that the data packed into substructural elements can be transmitted transparently, i.e. without processing via the IP-oriented communication network and there is thus no compression/decompression and conversion according to the RTP protocol at the transmitter and receiver end.

A further advantage of the method according to the invention consists in that, by substructuring the data packets set up for a data transmission via the IP-oriented communication network into the substructural elements, data allocated to different communication terminals can be transmitted within a data packet.

Furthermore, the present invention, due to the transmission of an individually adjustable number of payload bytes associated with a voice link in a substructural element of a data packet, is capable of a data transmission with a variable transmission rate. This makes it possible to use compression algorithms which generate a variable datastream without corruption of the information, from a continuous datastream in dependence on the redundancy existing in the data to be transmitted.

In addition, due to the definition of the first payload segment of a data packet as a pointer which designates the start address of a first substructural element located in the payload area of the data packet, by implementing the present invention it is possible to synchronize transmitter and receiver in a simple manner when one or more data packets are lost.

DETAILED DESCRIPTION OF THE PREFERRED EMBODIMENT

Examples of data networks in which IP protocols are preferably used are the 'Ethernet' according to IEEE (Institute of Electrical and Electronic Engineers) Standard 802.3 or the 'Tokenring' according to IEEE Standard 802.5. Furthermore, IP HUBs IP-HUB—frequently called 'Hub' in the literature—are connected to the IP-oriented communication network IP-KN. The IP hubs are connected to the IP-oriented communication network IP-KN via further access units AE. The IP hubs IP-HUB additionally have subscriber interfaces TSS for connecting communication terminals to the IP-oriented communication network IP-KN, Communication terminals KE1, . . . ,KEn, which are connected to an IP hub IP-HUB via the subscriber interfaces TSS are shown by way of example.

A data transmission between the communication terminals KE1, . . . ,KEn and the switching system PBX usually takes place on the basis of substructural elements SE according to the ATM adaptation layer ML-Typ2. For a data transmission between the communication terminals KE1, . . . ,KEn and a switching system PBX via the IP-oriented communication network IP-KN, a bi-directional conversion takes place between the data format formed from substructural elements SE and the data format of the IP-oriented communication network IP-KN due to the access units AE in accordance with two different conversion modes which are explained in greater detail below.

Figure 1:
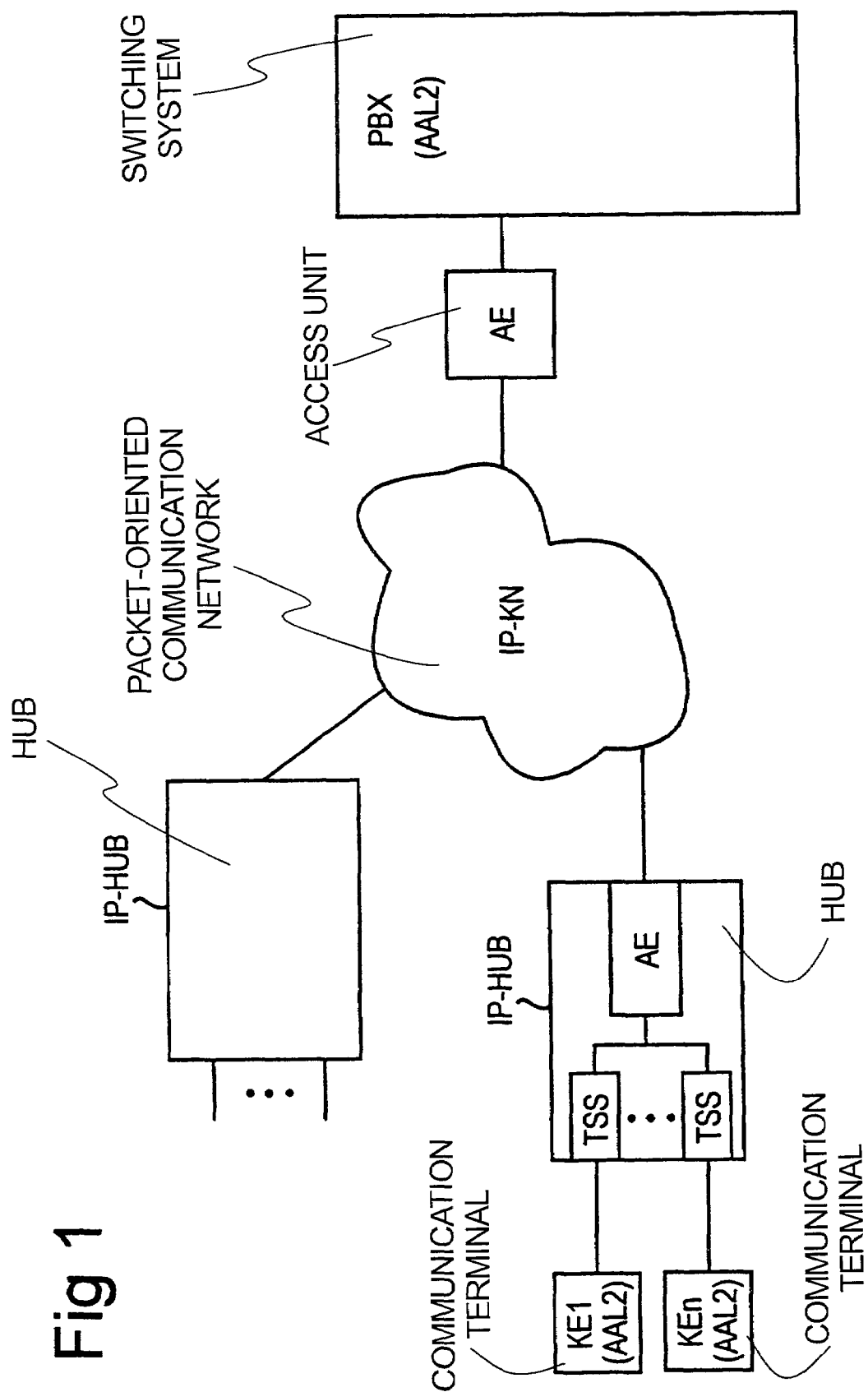
FIG. 1 shows a structure diagram for the diagrammatic representation of communication terminals connected to a switching system via an IP-oriented communication network.
Figure 2:
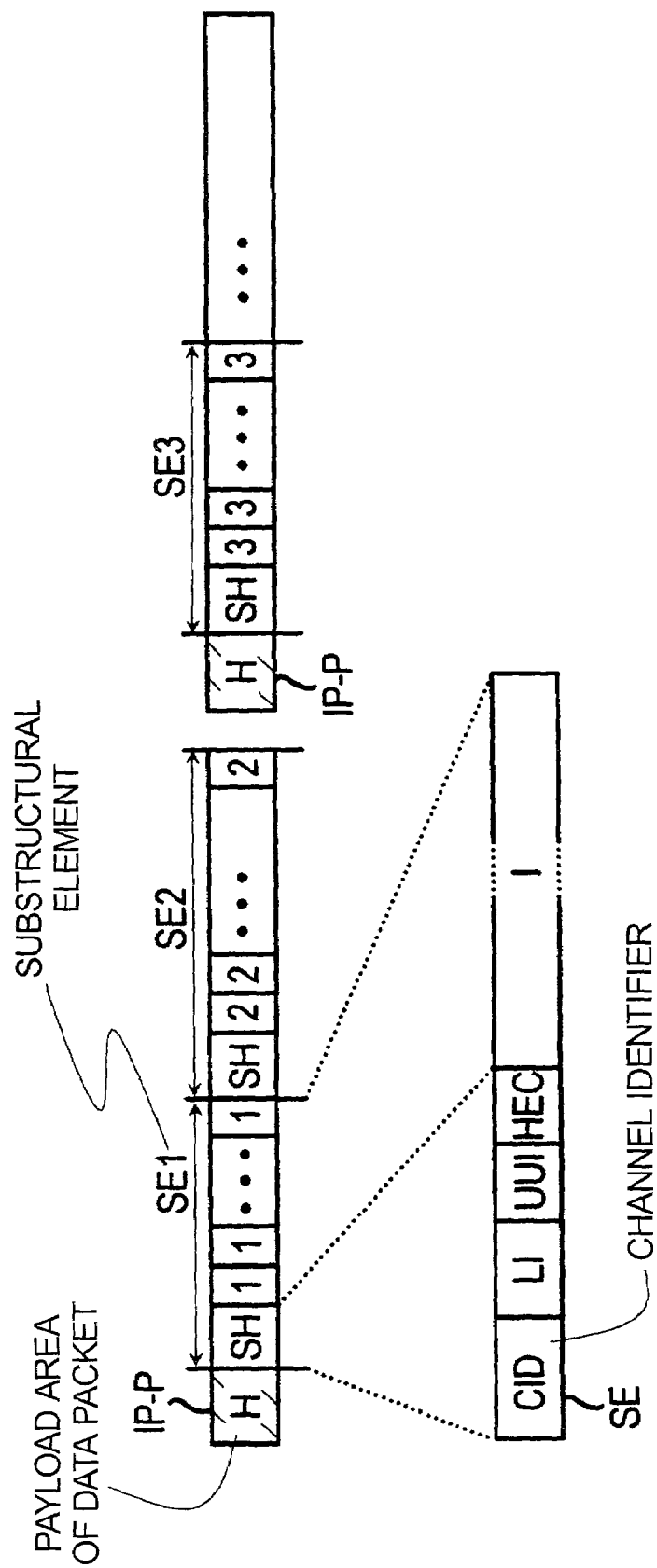
FIG. 2 shows a structure diagram for the diagrammatic representation of IP data packets subdivided into substructural elements in accordance with a first conversion mode.

FIG. 2 shows a diagrammatic representation of IP data packets IP-P, subdivided into substructural elements SE, according to a first conversion mode. An IP data packet IP-P is composed of a packet header H and a payload field with a variable length of 1-65536 bytes. In the packet header H, switching data such as, for example, the destination address and the original address of an IP data packet IP-P are essentially stored.

A substructural element SE is composed of a 3-byte-long cell header SH and a payload area I of variable length (0 to 64 bytes). The cell header of a substructural element SE, in turn, is subdivided into an 8-bit-long channel identifier CID, a 6-bit-long length indicator LI, a 5-bit-long user-to-user indication UUI and a 5-bit-long cell header HEC. The channel identifier CID provides a possibility of allocating a substructural element SE to a certain connection via the IP-oriented communication network IP-KN and thus to transmit data associated with different communication terminals KE1, . . . , KEn in an IP data packet. The length indicator LI provides a possibility of defining a payload area I of variable length so that a voice connection between a communication terminal KE1, . . . , KEn and the switching system PBX can be implemented with variable transmission bit rate. This enables compression algorithms which generate a variable datastream without corruption of the information from a continuous datastream in dependence on the redundancy existing in the data to be transmitted, to be used in the communication terminals KE1, . . . , KEn.

According to the first conversion mode, the substructural elements SE are inserted into the payload field of an IP data packet IP-P in such a manner that the first byte of the payload field is occupied by a cell header SH of a substructural element SE and the last byte of the payload field ends with the last byte of a substructural element SE. This means that the length of the payload field of an IP data packet IP-P is selected in such a manner that one or more substructural elements SE are transmitted completely in an IP data packet IP-P. By way of example, two substructural elements SE1, SE2 are transmitted completely in a first IP data packet IP-P and one substructural element SE3 is transmitted in a second IP data packet IP-P in the figure.

In the case where one or more IP data packets IP-P have been lost, for example due to a transmission error, a synchronization between transmitter and receiver is possible by means of the length indicator LI of the first substructural element SE transmitted in the payload field of an IP data packet IP-P since the position of any further substructural elements SE which may be arranged in the payload field can be determined from this length indicator LI.

Figure 3:
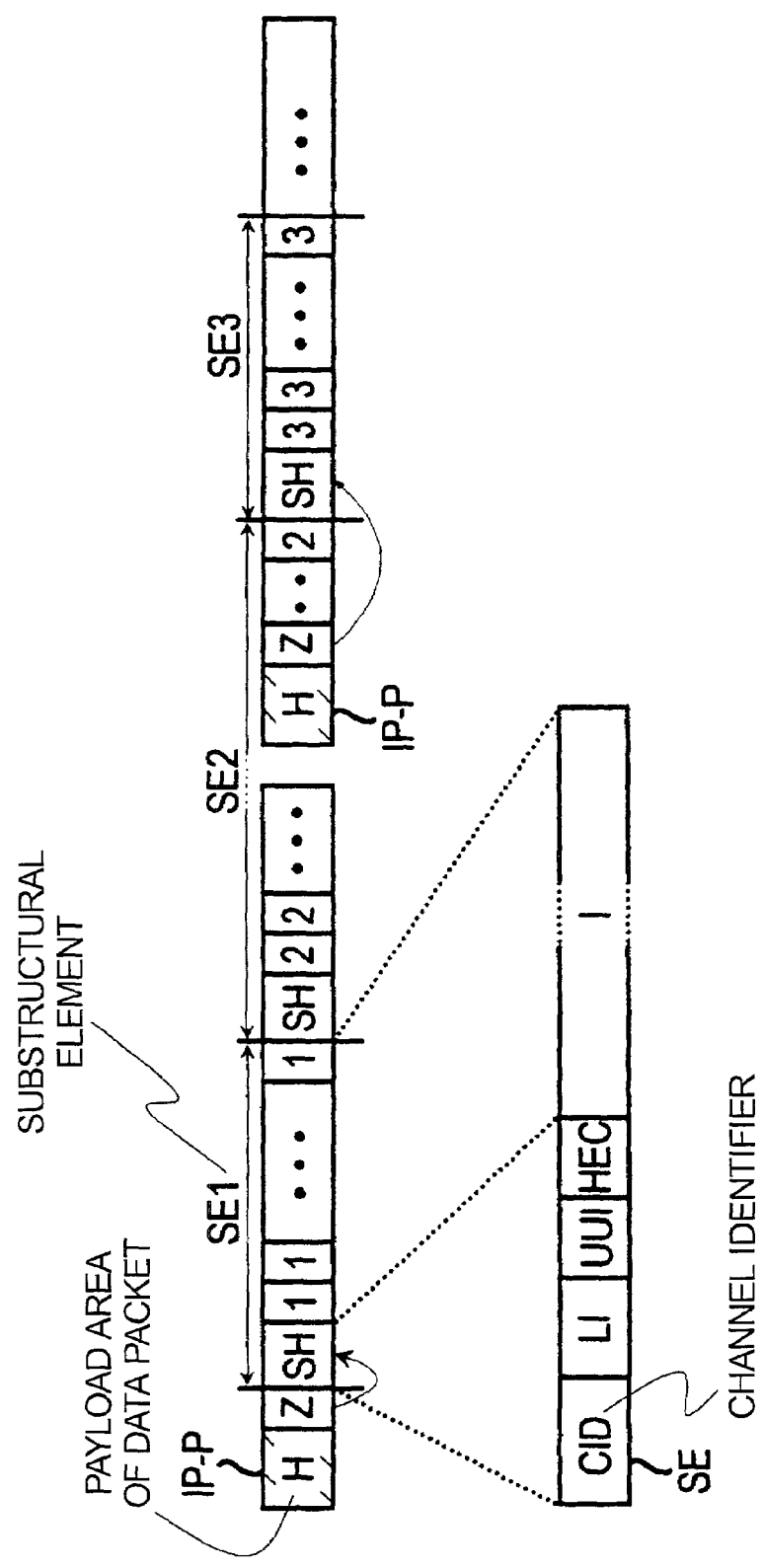
FIG. 3 shows a structure diagram for the diagrammatic representation of IP data packets subdivided into substructural elements in accordance with a second conversion mode.

FIG. 3 shows a diagrammatic representation of IP data packets IP-P subdivided into substructural elements SE according to a second conversion mode. According to the second conversion mode, substructural elements SE can also be distributed over payload fields of a number of IP data packets IP-P. Shown by way of example for the substructural element SE2 in the figure. The consequence of this is that it is no longer mandatory that the payload field of an IP data packet IP-P must begin with a cell header SH of a substructural element SE so that, when one or more IP data packets are lost, synchronization of transmitter and receiver by means of the length indicator LI of a substructural element SE is no longer possible.

For this purpose, the first byte of the payload field of an IP data packet IP-P is defined as pointer Z. Thus, the substructural elements SE are only transmitted with the second byte of the payload field of an IP data packet IP-P. This pointer Z specifies the start address of the first substructural element SE, the cell header SH of which is located in the payload field of an IP data packet IP-P. This pointer Z can thus be used for restoring the synchronization between transmitter and receiver.

During a data transmission from a communication terminal KE1, . . . , KEn to the switching system PBX, the data to be transmitted are transmitted by the communication terminal KE1, . . . , KEn in the form of substructural elements SE to the IP hub IP-HUB associated with the communication terminal KE1, . . . , KEn. The substructural elements SE are inserted into data packets IP-P in accordance with the first or second conversion mode, in the access unit AE of the IP hub IP-HUB, the data packets IP-P exhibiting the IP address of the access unit AE associated with the switching system PBX in the packet header H. After that, the data packets IP-P are transmitted via the IP-oriented communication network IP-KN to the access unit AE associated with the switching system PBX. This access unit AE extracts the substructural elements SE contained in the received data packets IP-P and forwards the extracted substructural elements SE to the switching system PBX.

During a data transmission from the switching system PBX to a communication terminal KE1, . . . , KEn, the data to be transmitted are transmitted by the switching system PBX in the form of substructural elements SE to the access unit AE associated with the switching system PBX. In the access unit AE, the substructural elements SE are inserted into data packets IP-P in accordance with the first or, second conversion mode, the data packets IP-P exhibiting in the packet header H the IP address of the IP hub IP-HUB associated with the communication terminal KE1, . . . , KEn. The data packets IP-P are then transmitted via the IP-oriented communication network IP-KN to the IP hub IP-HUB addressed. In the access unit AE of the IP hub IP-HUB, the substructural elements SE contained in the received data packets IP-P are extracted and forwarded to the corresponding communication terminal KE1, . . . , KEn by means of the channel identifier CID stored in the substructural elements SE.

Due to the transmission of data combined in the substructural elements SE in accordance with the ATM adaptation layer AAL-Typ2 via the IP-oriented communication network IP-KN, there is no bi-directional conversion between the data format structured into substructural elements SE and the RTP data format normally used for transmitting voice data via the IP-oriented communication network IP-KN. In addition, the associated compression/decompression of the data does not take place either. Thus, an end-to-end transmission of voice data based on substructural elements SE via an IP-oriented communication network IP-KN is possible without loss of voice quality due to multiple compression and decompression of the voice data to be transmitted since the voice data are transmitted transparently, i.e. without processing in the substructural elements SE via the IP-oriented communication network IP-KN.

Although other modifications and changes may be suggested by those skilled in the art, it is the intention of the inventors to embody within the patent warranted hereon all changes and modifications as reasonably and properly come within the scope of their contribution to the art.

We claim:

1. A method for transmitting data from communication terminals to a switching system via a packet-oriented communication network, comprising the steps of:
    setting up a data format formed of substructural elements for a data transmission between a switching system and a plurality of communication terminals, said communication terminals being connected to a packet oriented communication network via a hub with subscriber interfaces for each of said communication terminals, said switching system being connected to said packet-oriented communication network via an access unit separate from the hub,
    transmitting said data in a form of substructural elements to said hub by one of said communication terminals,
    inserting said substructural elements into data packets by said hub,
    inserting further substructural elements from another communication terminal into said data packets, such that said substructural elements and said further substructural elements are inserted into common data packets, transmitting said data packets to the access unit via the packet-oriented communication network, and
    extracting said substructural elements from said data packets by said access unit, and forwarding said substructural elements to said switching system by said access unit, wherein said data packets are structured as Internet Protocol data packets.

2. A method for transmitting data from a switching system to communication terminals via a packet-oriented communication network, comprising the steps of:
    setting up a data format formed of substructural elements for a data transmission between a switching system and a plurality of communication terminals, said communication terminals being connected to a packet oriented communication network via a hub with subscriber interfaces for each of said communication terminals, said switching system being connected to said packet-oriented communication network via an access unit separate the hub,
    transmitting said data in a form of substructural elements to the access unit by said switching system,
    inserting said substructural elements from another communication terminal into said data packets by said access unit, such that said substructural elements and said further substructural elements are inserted into common data packets,
    transmitting said data packets to the hub via the packet oriented communication network,
    extracting said substructural elements from said data packets via said hub, and forwarding said substructural elements to a corresponding communication terminal, wherein said data packets are structured as Internet Protocol data packets.

3. A method according to claim 1, wherein each substructural element exhibit a cell header, said cell header storing a channel identifier for designating an association of said each substructural element with a communication terminal, said cell header further storing a length indicator for specifying a number of payload segments transmitted in said each substructural element.

4. A method according to claim 1, wherein said substructural elements are structured according to an ATM data format in accordance with a convention known as Second ATM adaptation layer.

5. A method according to claim 1, further comprising the step of: arranging said data transmission and said substructural elements in a payload area of an Internet Protocol data packet such that a substructural element begins in a segment defined as a first payload segment of the Internet Protocol data packet.

6. A method according to claim 5, further comprising the step of:
    defining a pointer in said first payload segment for designating a start address of a first substructural element segment, said first substructural element located in the payload area of the Internet Protocol data packet.

7. A method for transmitting data from communication terminals to a switching system via a packet-oriented communication network, comprising the steps of:
    setting up a data format formed of substructural elements for a data transmission between a switching system and communication terminals, said communication terminals being connected to a packet oriented communication network via a hub, said switching system being connected to said packet-oriented communication network via an access unit separate from the hub,
    transmitting said data in a form of substructural elements to said hub by a communication terminal,
    inserting said substructural elements into data packets by said hub, such that substructural elements from different communication terminals are inserted into common data packets,
    transmitting said data packets to the access unit via the packet-oriented communication network, and
    extracting said substructural elements from said data packets at said access unit, and forwarding said substructural element from said access unit to said switching system, wherein said data packets are structured as Internet Protocol data packets.

* * * * *